United States Patent [19]

Peters, Jr. et al.

[11] Patent Number: 5,715,449
[45] Date of Patent: Feb. 3, 1998

[54] METHOD FOR GENERATING STRUCTURED MEDICAL TEXT THROUGH USER SELECTION OF DISPLAYED TEXT AND RULES

[75] Inventors: Richard M. Peters, Jr.; Edmund Billings, Jr., both of San Francisco; Steven Dakin, Mountain View; James Mackraz, Palo Alto; Richard M. Peters, Sr., Menlo Park; John Robison, Sunnyvale; Russell Selph, Palo Alto; Joyce Abrams, San Rafael; Ron Burback, Pleasanton, all of Calif.

[73] Assignee: Oceania, Inc., Palo Alto, Calif.

[21] Appl. No.: 263,646

[22] Filed: Jun. 20, 1994

(Under 37 CFR 1.47)

[51] Int. Cl.⁶ .................................................. G06F 17/30
[52] U.S. Cl. .................... 395/613; 395/605; 395/606; 395/603; 395/202; 395/776; 395/774
[58] Field of Search ........................ 364/413.01, 406; 395/600, 604, 793, 795, 601, 602, 701, 759, 605, 606, 607, 202, 776, 774, 603

[56] References Cited

U.S. PATENT DOCUMENTS

| | | | |
|---|---|---|---|
| 4,752,889 | 6/1988 | Rappaport et al. | 395/12 |
| 4,905,138 | 2/1990 | Bourne | 395/707 |
| 5,063,534 | 11/1991 | Kishimoto | 395/757 |
| 5,111,398 | 5/1992 | Nunberg et al. | 395/759 |
| 5,175,814 | 12/1992 | Anick et al. | 395/348 |
| 5,276,793 | 1/1994 | Borgendale et al. | 395/774 |
| 5,327,341 | 7/1994 | Whalen et al. | 128/630 |
| 5,341,469 | 8/1994 | Rossberg et al. | 395/776 |
| 5,421,008 | 5/1995 | Banning et al. | 395/604 |
| 5,471,382 | 11/1995 | Tallman et al. | 395/203 |
| 5,515,488 | 5/1996 | Hoppe et al. | 395/140 |
| 5,544,360 | 8/1996 | Lewak et al. | 395/601 |
| 5,600,835 | 2/1997 | Garland et al. | 395/605 |
| 5,652,842 | 7/1997 | Siegrist, Jr. et al. | 395/202 |

*Primary Examiner*—Thomas G. Black
*Assistant Examiner*—Charles L. Rones
*Attorney, Agent, or Firm*—Philip H. Albert; Townsend and Townsend and Crew LLP

[57] ABSTRACT

A message originator is presented with a tree of phrase choices organized from broad to specific categories, with the selections in more specific categories directed by the originator's selections in the broader categories. In a specific embodiment, the selections relate to a patient's medical condition and observations of a health care provider, with broader categories indicating general body systems and narrower categories indicating specific items, including values for properties of an item described by other selections on the path. The text of the message is also presented to the originator, who can then edit the message as text. The text is derivable from the tree structure selections, or path, taken from the originator and the interspersed free form text. At any time in an editing process, or a viewing process after the message has been fixed, an editor or viewer can reselect the path on the tree which generated the text. The system also allows for editing of notes, and will integrate a path of a note into another path where new paths are added. When a path is integrated, generating naturally worded text representations is simpler.

6 Claims, 6 Drawing Sheets

| METHOD | FINDING | PROPERTY | LOCATION | Abdomen |
|---|---|---|---|---|
| Palpation | Tenderness | Location | Abdomen | Lwr. lt. quad |

PALPATION - TENDER IN LOWER RIGHT ABDOMEN.

INSPECTION - REDNESS MILD AND IS DECREASING

FIG. 4.

METHOD FOR GENERATING STRUCTURED MEDICAL TEXT THROUGH USER SELECTION OF DISPLAYED TEXT AND RULES

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of structured text manipulation systems.

Several methods for structured text manipulation are known. For example, in a typical word processor, words are collected into units of sentences, paragraphs and sections, and these units can be operated upon. However, while providing maximal flexibility in the choice of text, the interrelationship between the words used cannot be accurately and easily discerned by an automatic analysis program. Although this is usually not a problem for human readers, who can usually parse a sentence to determine the subjects, nouns, and which modifiers apply to which parts of speech present in a sentence, this process is difficult for a computer. In some cases, such as a sentence about a "little red school jacket", even a human reader would have difficulty determining which modifiers modify which word, noun or adjective, in the phrase.

If the text is to be used just as text, the ambiguity is not a problem, since the context will usually provide the human reader with enough information which he or she can then use to resolve the ambiguity. Where the text is to be analyzed by a computer or mechanical text processor, however, the text might not be interpretable.

One solution to providing unambiguous information to such a processor is to limit the text to a well-defined computer language. Computer languages exist for programming, and also exist for other means of communication intended to be readable by both humans and computers. For example, some highly-structured languages provide for pseudo-coded instructions understandable by both computers and humans. Such a language has limited utility where not all the possible messages to be communicated can be considered in advance. Such is the case in the medical information field, where patient data is to be made understandable by both medical health care providers (HCP's) and analysis engines. The analysis engines might be employed to review the test to produce billing information, drug-drug interaction data, quality control functions, and the like.

The computer language approach to providing unambiguously analyzable messages is equivalent to providing a fixed set of multiple choice selections to the message composer and storing the message as a list of the selections made. While this might be suitable in many applications, in medical records management, this unacceptably limits HCP's in the task of accurately communicating a patient's situation.

What is needed is a method and apparatus for entry of messages readable by both human readers and analytical engines, and easily understood by those engines. Furthermore, if these messages and engines are to be used in a medical records environment, the messages must conform to legal requirements for medical records. These requirements concern the text of the message itself and not its underlying structure.

SUMMARY OF THE INVENTION

An improved message entry and storage system is provided by the present invention. In the system, a message originator is presented with a tree of phrase choices organized from broad to specific categories, with the selections in more specific categories directed by the originator's selections in the broader categories. The text of the message is also presented to the originator, who can then edit the message as text. The text is derivable from the tree structure selections, or path, taken from the originator and the interspersed free form text. At any time in an editing process, or a viewing process after the message has been fixed, an editor or viewer can reselect the path on the tree which generated the text.

In a specific application, the message originator is a health care provider (HCP) and the message is a note providing that HCP's observations or instructions relative to a patient. The tree provided to the message originator is a set of phrases to describe these observations or instructions, with broader categories indicating general body systems and narrower categories indicating specific items, including values for properties of an item described by other selections on the path.

The system also allows for editing of notes, and will integrate a path of a note into another path where new paths are added. An integrated path makes the generation of naturally-worded text representations simpler.

A further understanding of the nature and advantages of the inventions herein may be realized by reference to the remaining portions of the specification and the attached drawings.

BRIEF DESCRIPTION OF THE DRAWINGS

FIG. 4 is a more detailed view of the display of the computer system shown in FIG. 1, illustrating the effects of a path selection on the selection display and the corresponding emitted text;

DESCRIPTION OF THE PREFERRED EMBODIMENTS

Figure 1:
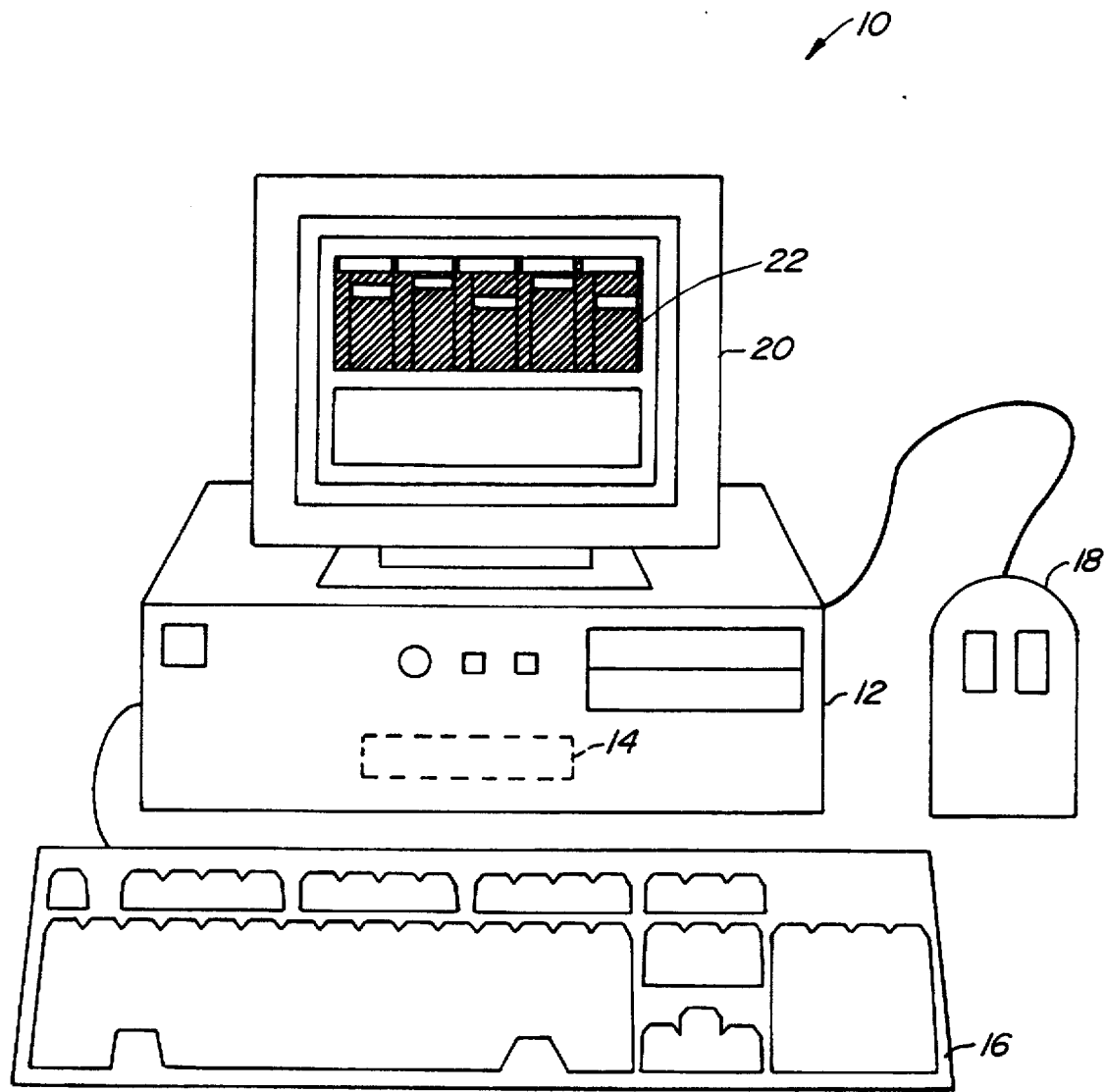
FIG. 1 is an illustration of a computer used to enter and edit notes.

FIG. 1 illustrates a typical means of message origination, a workstation 10. Of course, other data entry means, such as hand-held computers, voice-activated computers, personal desktop computers, mainframe terminals, etc., function equally well. Workstation 10 includes a computer system 12 coupled to a fixed disk 14, a keyboard 16, a mouse 18, and a monitor 20. Monitor 20 is shown with a display surface 22.

Figure 2:
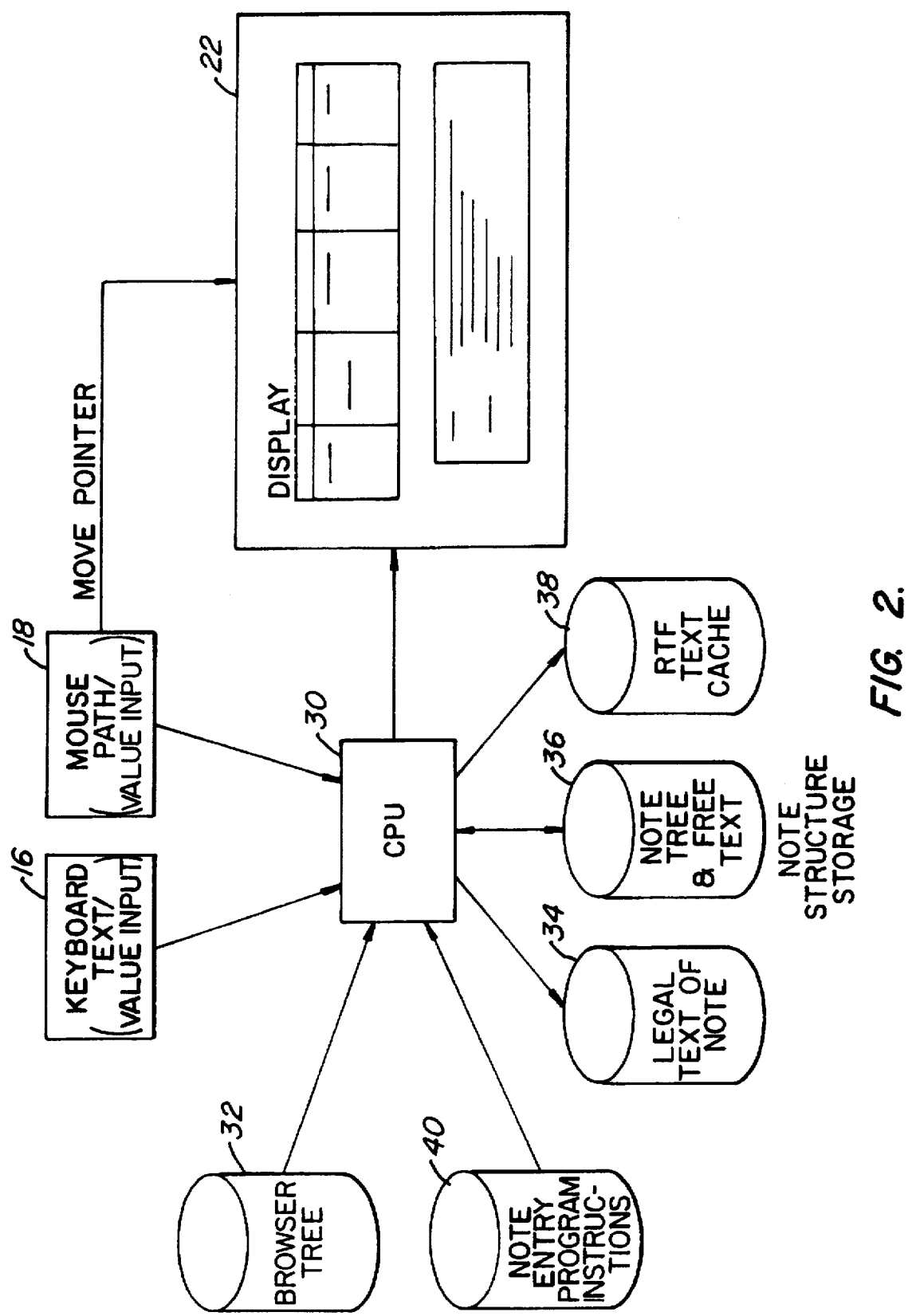
FIG. 2 is a block diagram of the computer system shown in FIG. 1.

FIG. 2 is an operational block diagram of workstation 10. Workstation 10 is shown with a central processing unit ("CPU") 30 coupled to display 22, mouse 18, keyboard 16, a browser tree memory 32, a legal text memory 34, a note tree memory 36, and a rich-text format (RTF) text cache 38. Mouse 18 is also coupled to display 22 to provide a display of a mouse pointer responsive to mouse movements. The associated drivers for the various devices are not shown. CPU 30 is used to process instructions of a note entry program which are stored in instruction memory 40. The functions of the various aspects of the diagram of FIG. 2 are discussed below.

Figure 3:
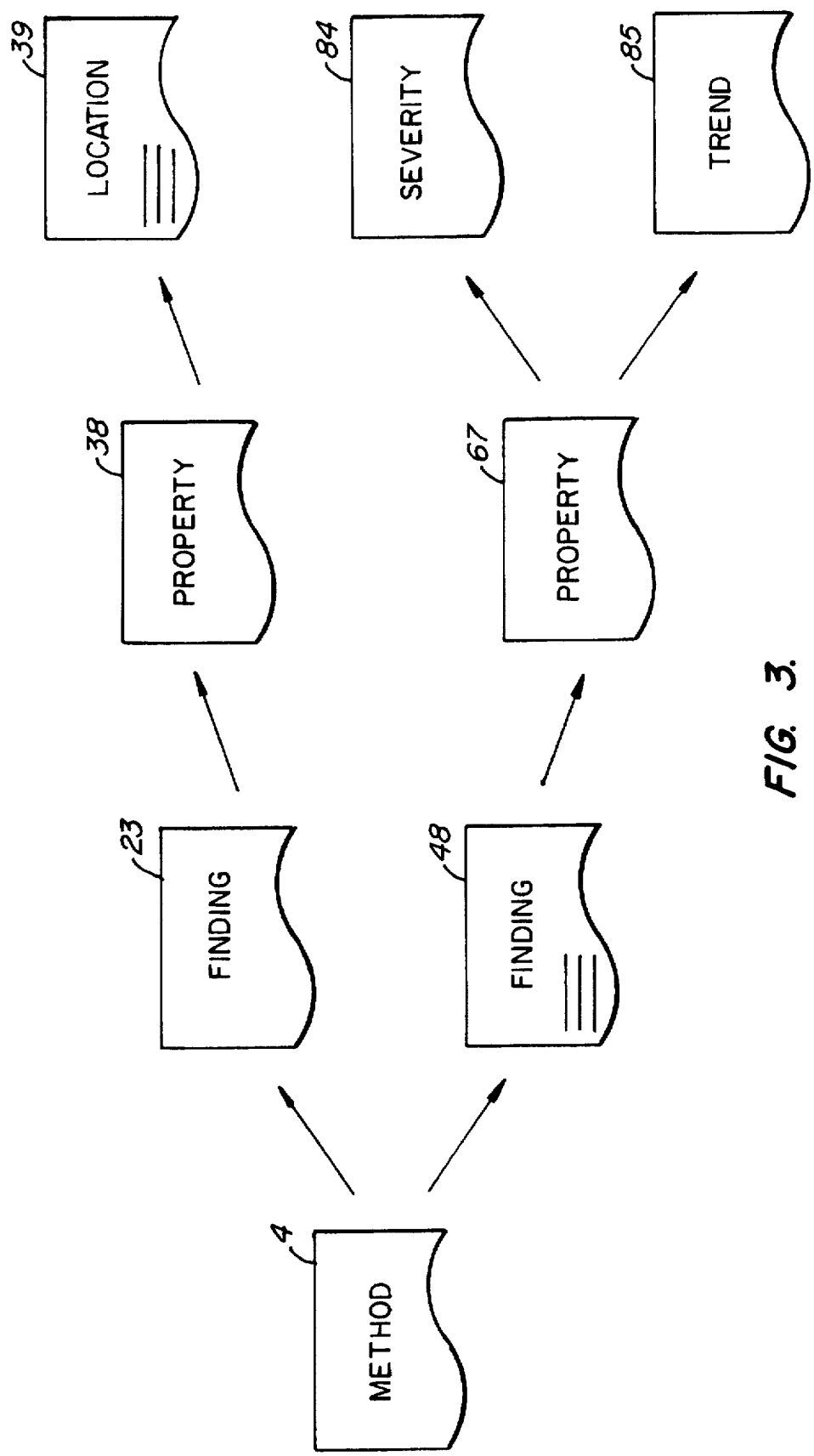
FIG. 3 is a high-level view of browser files forming a browser tree structure.

FIG. 3 is a logical view of a browser tree structure 50 used to generate notes. In a structured text system, there may be more than one browser tree. The particular tree shown in FIG. 3 is used for medical applications, and thus has nodes suited for those applications. Each browser file contains browser records for a list and is identified by a list number appearing in the upper left corner of each file shown in FIG. 3. Some files contain child records (as explained below), and are shown with the child records indicated by lines within the file, as is the case with lists 23 and 39.

For ease of manipulation by a digital computer, each list is organized as a series of node records. The contents of an example browser tree, which is used to generate the display shown in FIG. 4, is shown in Table 3, below. Each list has an associated list type. As shown in FIG. 4, this is the title of the column for that list. For example, list 4 is a list of "METHOD" selections. Table 3, which shows excerpted details of the browser tree, shows two nodes, numbered 1 and 2, of list 4. As should be apparent from Table 3, each node of browser tree 50 is uniquely identified by its list number combined with its node number. Each node is also identified by a unique code and characterized by other fields.

In a specific implementation on a computer running the UNIX® operating system, the browser tree is part of a data repository using the UNIX® file system to construct a hierarchical "browser file" tree, wherein each browser file has a header followed by a variable number of "node" structures. The node structures represent the selectable terms which appear in each column and may include a link to a browser file representing a next level of the tree.

A header structure of a browser file includes the fields shown in Table 1 below.

TABLE 1

| Browser Header Structure (for a List) | |
|---|---|
| Field | Description |
| List# | This might be implied by the UNIX ® file system file name for the browser file. |
| Title | It is placed at the top of the column. Also referred to as the Column Type. |

A structure of a node of a browser file includes the fields shown in Table 2 below.

TABLE 2

| Browser File Node Structure | |
|---|---|
| Field | Description |
| Node # | Unique number within the list |
| Node ID | Unique over the structured text system |
| Label/Name | Text which appears in the column for selection |
| Emitted Text | Text which appears in "legal text" view of note |
| Flags | Flags and emission rules control behavior of the emitted text |

TABLE 2-continued

| Browser File Node Structure | |
|---|---|
| Field | Description |
| # subnodes | Number of children of this node. Subnode selections are stored in the same file as the parent nodes. |
| Next | Links (points) to next browser file. If # of subnodes is 0 and this field is a null pointer, this node is a "leaf" node. |
| Type | Indicates desired pop-up panel behavior. For example, with blood pressure, the pop-up panel would allow for entry of two numerical values within allowable ranges. |

As explained above, Table 3 is an example of the data stored in a browser tree.

TABLE 3

| List# | (Column Type/Title) | | | |
|---|---|---|---|---|
| | Node# | Node ID Label, Name | Next List Emitted Text | # of Subnodes Flags/Emission Rules |
| 4 | (METHOD) | | | |
| | 1 | 12345 Inspection | 48 "Inspection -" | 0 always emit, bolded |
| | 2 | 12346 Palpation | 23 "Palpation -" | 0 always emit, bolded |
| 23 | (FINDING) | | | |
| | 1 | 13552 Tenderness | none "tender" | 3 always emit |
| | 1a | 13553 Absent | 38 "not" | 0 negation, exclusive |
| | 1b | 13554 Present | 38 none | 0 exclusive |
| | 1c | 13555 Frequently | 38 "frequently" | 0 prepend |
| 38 | (PROPERTY) | | | |
| | 1 | 14329 Location | 39 none | 0 — |
| 39 | (LOCATION) | | | |
| | 1 | 14587 Chest | none "entire chest area" | 0 — |
| | 6 | 15245 Abdomen | none none | 3 — |
| | 6a | 15246 entire | none "entire abdomen" | 0 exclusive |
| | 6b | 15247 lower rt. quad | none "lower right abdomen" | 0 exclusive |
| | 6c | 15248 lower lt. quad | none "lower left abdomen" | 0 exclusive |
| 48 | (FINDING) | | | |
| | 3 | 17054 Redness | 67 "redness" | 0 if severity=severe, "very red" |
| 67 | (PROPERTY) | | | |
| | 1 | 19930 Severity | 84 none | 0 — |
| | 2 | 19931 Trend | 85 none | 0 — |
| | 3 | 19932 Blood Pressure | value(BP) "BP= %s/%s" | 0 replace %s with values |
| 84 | (SEVERITY) | | | |
| | 8 | 39874 Mild | none "mild" | 0 — |
| 85 | (TREND) | | | |
| | 1 | 40987 Decreasing | none "is decreasing" | 0 — |

For reasons of space, the data entry "type" fields are not shown in FIG. 3. The type field is used to indicate how to get input from the user. Typically, the type field indicates that the input from the user is a selection of a node from a list presented. For some entries, such as dosage information, instead of giving the user a set of fixed choices, a dialog window opens and requests entry of a numerical value. Wherever the desired response is other than a selection from a well-defined set of choices, such a pop-up dialog window will be indicated by the type field. This is a per-node field instead of a per-list field, because one list is allowed to contain items of different types, which may require different pop-up dialog windows depending on the type of the item.

The emission rules are generally described by flags (four of which are described below) and conjunction rules (also described below) for each node, and control how the node contributes to the string of structured text which is emitted. The flags include:

Exclusive Flag—When set, all siblings of the node are excluded from the emitted text except the most recently selected sibling which has an "exclusive flag" set. This is so a parent node can only have one "exclusive" child in the emitted text at any one time. This is sometime known as "radio button" behavior.

Text Prefix Flag—When set, the text emission engine will prepend a parent's text value to that of the current node, to allow a text 'chain' starting from the current node and traversing the browser selection to the left until a break in the chain (a node without the text prefix flag set) is encountered. An example of the use of this flag is shown in Table 3. If a user selects, under Finding, the choice "Tenderness" (List #23), and then selects "frequently", the emitted text would be "frequently tender" rather than "tender frequently".

Negation Flag—When set, it operates as a 'prepend' flag, and causes the node's emitted text to be prepended to the subject of the sentence which contains it. Text for negative nodes is shown in the reverse order in which the nodes are selected. That is to say that any negative node text is prepended to the absolute beginning of the sentence. An example of the use of this flag is shown in Table 3. If a user selects, under Finding, the choice "Tenderness" and then selects "Absent", the emitted text would be "not tender" rather than "tender not".

Emit Property Flag—When set, the text emission engine emits the property as well as the emitted text.

The conjunctions, with their rules, include:

Period (.)—separates sentences.

Colon (:)—separates a group of sentences from its header. The header is understood to be common to all sentences, but only displayed once. An example is the 'system' header for a physical exam, which might be displayed as:

Cardiac System: Sentence 1. Sentence 2. General: Sentence 1. . . .

Comma (,)—separates properties (and all associated values) within a sentence. For example:

Subject property 1 value 1, property 2 value 2.

And (and)—separates values within a property group. For example:

Subject property 1 value 1 and value 2, property 2 value 3 and value 4 and value 5.

In the process of entering a note, the user selects nodes from the labels/names shown on display 22. FIG. 4 is an example of how a display might appear if the browser tree of FIG. 3/Table 3 is used and particular nodes are selected. In this example, nodes 24444 (Method=Palpation), 18552 (Finding=Tenderness), 15329 (Property=Location), 12246 (Location=Lower right abdomen) are shown selected. These nodes, taken together, form a "path" of nodes. Note that two columns are used to provide all the possible choices for the "Location=" node. The use of more than one column for a node selection is indicated by the use of normal case on all titles following the first column for that node (e.g., "LOCATION", and "Abdomen").

At the start of a path selection operation, only the first column, "METHOD", is presented to the HCP. This column corresponds to List #4 in FIG. 3. When item 2 is selected, CPU 30 reads the corresponding next list entry for item 2, which is list 23, and presents list 23 ("FINDING") in the second column. When item 1 of list 23 ("TENDERNESS") is selected, CPU 30 reads the "next list" field of that entry, which is list 38, and displays that list ("PROPERTY") in the third column. From that list, item #3 ("LOCATION") is shown selected, which causes CPU 30 to present list #39 in the fourth column.

The "LOCATION" list is presented differently, since there are a great many choices for location than would be practical on a single list. Thus the response to location is actually presented in two columns; this is indicated by the use of ";" in the Label The selection "Abdomen" and "Lower lt. quad" result in only one node being added to the note list, namely the node associated with list 39, item 7. The selection ends with this node, since there is no next list for this node.

Each node includes a unique NODE ID, which survives the modification of the browser tree, so that the text of a node can be regenerated even if the node is no longer part of the browser tree. However, if the node is deleted and later regenerated, the NODE ID value of the regenerated node may be different. Once a path is selected from a method down to a node which does not have a next list (a "leaf node"), the legal text for that selection is displayed in a second portion of the display. This legal text is generated by CPU 30 from the emitted text field and the emission rules for each of the nodes in the path.

As is the general practice in the health care field, an observation is described by an examination method, a finding, and properties, which have values. Often multiple properties are described. Thus, the columns and levels visited by a path are generally in this order, although nothing in this embodiment of the present invention requires that the particular column headings shown in Table 3 be used.

Figure 5:
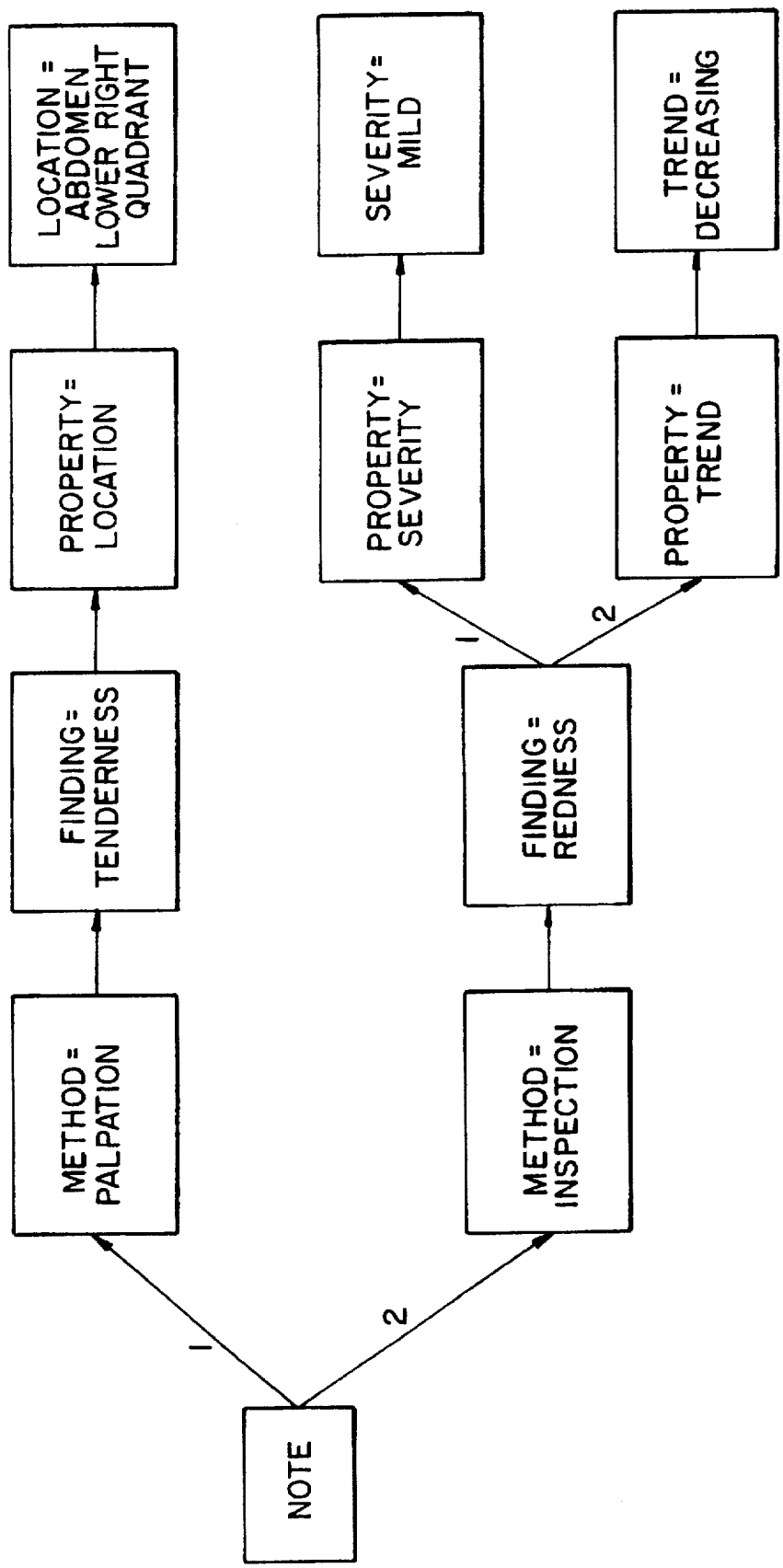
FIG. 5 illustrates the logical structure of a note tree.

FIG. 5 is a more visual, structured diagram of the note entered into note tree storage 36 using CPU 30. As shown in FIG. 5, multiple paths from a given node, such as the base note node, are ordered. As is shown by the correspondence between the diagram of FIG. 5 and the lower portion of the display shown in FIG. 4, the ordering determines the order of appearance in the text.

In the structured view, each message, generally called a "note", comprises a set of pointers to one or more sub-paths, which are ordered among themselves. The ordering indicates how any text "emitted" from the structure is ordered in the legal view. Text appears to the user to be "emitted", since after selection of a node along a path, or at the end of a path, text will be added to the legal text. (Although some node selections, by themselves, result in no text being emitted). For example, the node Property=Trend does not emit any text. However, in some embodiments, that node might emit the word "trend". The bold formatting indicated in the emission rules for the methods is also shown in FIG. 4.

In some cases, such as with a property, a value is more appropriate than a choice of selections at the next node in the path. For example, the "Property=Blood Pressure" node might lead to a value node, which is not presented as a series of choices, but as an opportunity to enter a number.

Once a path has been selected, the note can be completed, or another path can be selected. To edit the note, the user can select any sentence unit, which is a block of text, usually forming a sentence, emitted for one path. In FIG. 4, two sentence units are shown. If for example, the user were to select the first sentence unit, "Palpation ... abdomen.", CPU 30 would in response load the browser tree and execute the selections representative of the sentence unit, i.e. those selections shown in the upper portion of FIG. 4, and allow the user to change the selections. This is a preferred means of editing the text, since it remains formatted internally, instead of being all free-form text, as is the case with most text editing programs. The reloading of the browser file is made possible by the fact that CPU 30 stores the note tree in structure 36 (see FIG. 36) as well as the displayed text in RTF cache 38.

RTF cache 38 holds the text which is displayed on the lower half of display 22 and appears to the user to be what is being edited. It is just a cache, because it does not hold the actual note, just a temporary display representation of the note. For many medical records purposes, an exactly reproducible full text version of a note is necessary for the legally required paper trail, hence the name "legal" note. This legal text is stored in storage area 34, and is not normally used in editing. Once the legal text of a note is fixed, that note cannot be edited, so this is not much of a concern.

Often, when entering a note, or editing an existing note, the user will want to back track along a path and create a second branch, as is illustrated by the second branch of the note tree shown in FIG. 5. To avoid repetition, such as:

Palpation—Tender in lower right abdomen.

Inspection—Redness mild.

Inspection—Redness is decreasing.

CPU 30 combines paths to minimize the repetition when text is emitted.

Figure 6:
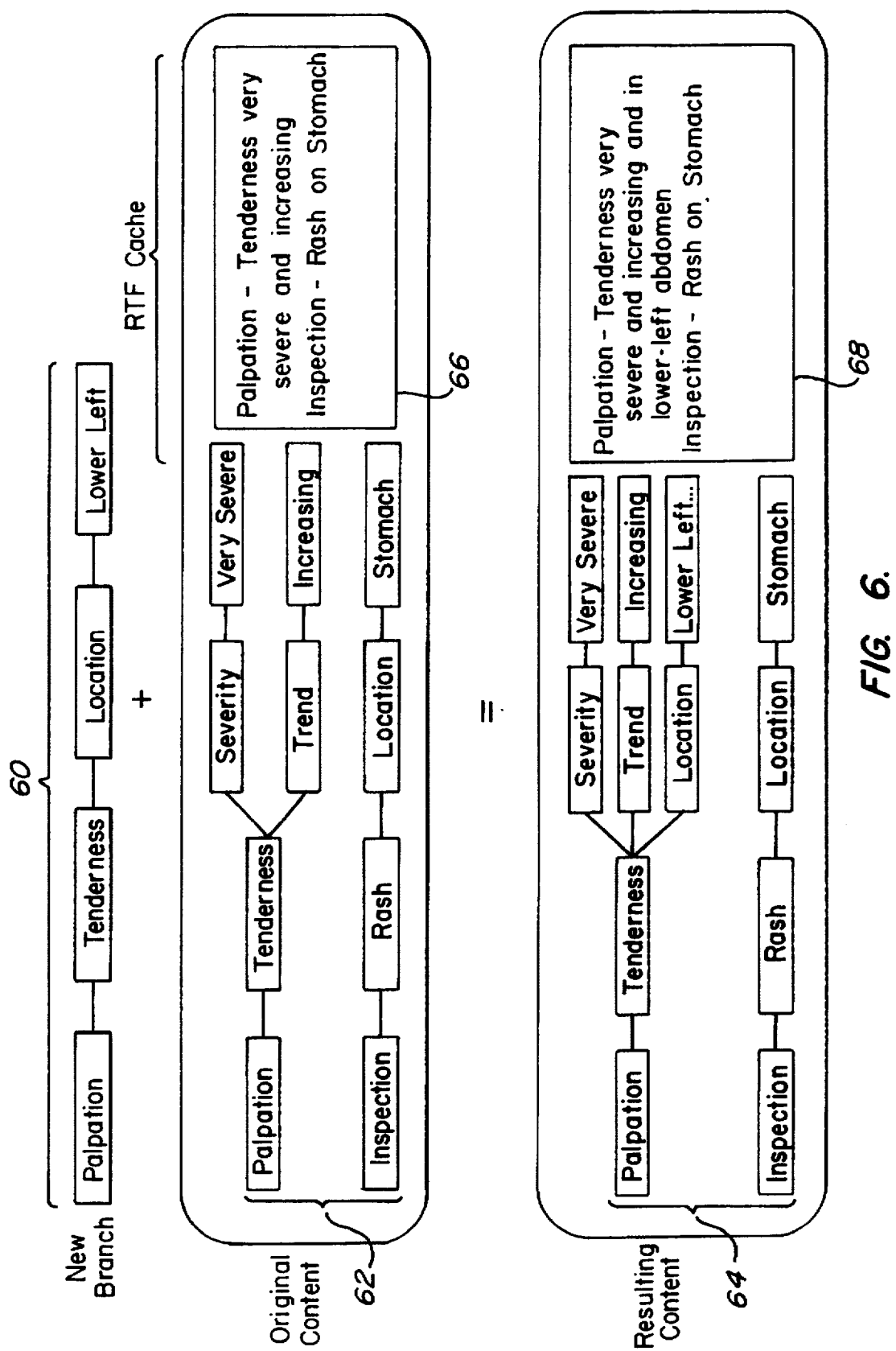
FIG. 6 is a diagram showing how a new path is integrated with an existing path for a note.

FIG. 6 illustrates how the CPU 30 deals with a new branch added to original content. FIG. 6 shows a new branch 60, a note tree 62 containing the original content, a note tree 64 containing the merged content, the text emitted for the original content in a display view 66, and the text emitted for the merged content in a display view 68.

The path of the new content is:

Method=Palpation (12436)

Finding=Tenderness (13552)

Property=Location (14329)

Location=Abdomen; lower lt. quad (15246)

and the first two nodes are in common between the new path and the original content. Therefore, as shown by note structure 64, the new branch is inserted as a path off of the Finding=Tenderness (13552) node. As the RTF cache 68 shows, this leads to good integration of the text when displayed.

In some embodiments, more sophisticated conjunction rules are provided for, wherein a node's emitted text field may include an associated "default conjunction rule" to direct the text emission engine as to how to perform linguistically proper conjunction operations. For example, suppose four nodes A, B, C and D are stored as children of a parent node, X. When X, with children A, B, C and D is emitted (added to the legal text representation), the text value for X is first emitted, followed by A (so far no punctuation has been necessary). Since there are more children to emit, an 'and' is emitted, followed by the next child (B). This process is repeated until all children have been emitted, and then a period is added at the end. This results in "A and B and C and D", however a rule that each child except for the second to the last and the last child is emitted followed by a comma, and the second to the last child is followed by "and" would result in more readable legal text. However, in some embodiments, the use of "and" repeatedly and not commas is preferred, if commas are used to separate PROPERTIES and a unique separator for values is desired. If the user sees no benefit of being able to identify property vs. value breaks (that is, commas and 'and's as uniquely different), then the more complex conjunction rule might be used.

The mapping of Browser Number and Node Tag to Oceania Clinical ID (OCCID) mapping is very useful for an exception charting engine. Every selection in a browser has a browser number (browser-level encoding) and tag (node-level encoding) associated with it. These two values are mapped to a single number, called an OCCID (or NODE ID, from FIG. 3), which is stored with the textual representation in the note. When the browser source of any text phrase must be recalled, the OCCID is mapped back to its original browser number and tag. These two values are then used to determine what browser to load and what node in that browser to select.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for generating structured text, comprising the steps of:

generating a browser tree which defines nodes for each of a plurality of phrases;

prompting a user to select nodes from an upper level of said browser tree;

accepting said selection of said upper level node;

displaying nodes from a lower level of said browser tree in a first display portion, where said nodes are nodes which are linked to said upper level node thus forming a path;

repeating said process of displaying, prompting and accepting until a node is reached which is at a lowest level, wherein a lowest level node is one which does not have a required link to any other node of a lower level; and displaying text, separate from said displayed nodes and selections, wherein said text is generated according to emitted text strings and emission rules maintained in said browser tree for each node, said emitted text strings being null strings or longer strings containing displayable text, wherein the emission rules describe relations between the path and the structured text; and wherein said browser tree nodes represent elements of a patient's medical condition, said text forms a note in said patient's patient chart, and a health care provider provides input.

2. The method of claim 1, further comprising the steps of:

accepting a selection of text displayed in said step of displaying text;

automatically generating paths through said browser tree which are equivalent to paths originally used to generate said displayed text;

displaying said selections and nodes in said first display portion as if said selections had been made manually; and prompting a user to modify said paths.

3. The method of claim 2, further comprising the steps of:

accepting modifications to said paths through said browser tree;

combining multiple paths with common nodes, if any multiple paths occur; and displaying text generated from said combined multiple paths and other modified paths.

4. The method of claim 1, wherein said note in said patient chart is fixed such that the words of the note are not changed after being fixed even if said browser tree is subsequently altered.

5. The method of claim 1, further comprising the steps of:

accepting free-form text and attaching said free-form text to a node; and incorporating said free-form text into said displayed text.

6. The method of claim 1, further comprising the steps of:

accepting a value in response to the selection of a node of a value-related type; and incorporating said value into said displayed text.

* * * * *